United States Patent Office 2,788,275
Patented Apr. 9, 1957

2,788,275

PROCESS FOR MAKING FAT-FREE ANIMAL FEED PRODUCTS

Robert Stöbe, Munich, Germany, assignor to Wacker-Chemie G. m. b. H., a German firm No Drawing. Application April 6, 1954, Serial No. 421,438. In Germany January 26, 1950
Public Law 619, August 23, 1954

Patent expires January 26, 1970

1 Claim. (Cl. 99—7)

This invention relates generally to methods for making animal feed products from fat-containing substances of animal origin, such as fish, animal carcasses and the like, and, more particularly, it is concerned with a novel process for making such products substantially fat-free, odorless, and in a dry, powdered or pulverulent state.

It is known to extract oil or fat from linseed and rapeseed, from glue boiler residues, from carcasses, and the like by means of organic solvents such as benzine, benzene, carbon disulphide, trichloroethylene, and the like. When using these solvents, the materials to be extracted must be dried to a water content of about 10% prior to extraction, in order that the solvents may be effective. In most cases, it is also necessary to further dry the materials after extraction, as they become damp in the course of the solvent being blown off by means of steam under pressure. It is therefore inevitable that appropriate expensive drying apparatus be used, to reduce the moisture content to about 10% in order to prevent mildew formation and rotting. The method described hereinbelow affords an essentially more economic procedure and, above all, it solves the problem of dehydration by a simple method. By this method, the product obtained is dry and powdery, whereas conventional processes often yield cohesive and unsightly masses that are ill suited for use as animal feeding material.

The method according to the invention consists essentially of a combination of several process steps, which, of course, may be subject to certain variations. In the first step the fat-containing substance of animal origin, i. e., fish, animal carcasses and the like, is heated and treated in a suitable reaction vessel in known manner by means of steam under pressure; thereby, the bones are softened, the flesh falls apart, etc., so that a substantially homogeneous and compact mass is obtained having a temperature of, for example, 119° C. Thereupon, liquid perchloroethylene is added to the mass, for two different purposes, and the mixture is subjected to distillation. On the one hand, the mass thereby becomes dehydrated as the water is distilled off with the perchloroethylene. On the other hand, the perchloroethylene penetrates into the gradually dehydrated and thus now-coherent mass, causing an efficient extraction of the fat. After a period of time, the extraction and dehydration processes are concluded, so that the liquid extract may be drawn off. Thereupon, the residual solid material is washed with perchloroethylene in order to remove the last remnants of fat. The next step, which is essential to the process according to the invention is now performed, namely the infusion of perchloroethylene vapors into the extracted mass. This is continued until the vapors escaping into the cooler have a temperature of about 119° C. The perchloroethylene is then blown off by means of steam having a temperature of about 115° C. Surprisingly, this does not cause the mass to agglomerate or to form lumps. After the blowing-off of the perchloroethylene, a practically fatfree, dry, odorless mass is obtained having a powdery and crumbly consistency, which is readily consumed by animals as a feeding stuff. To facilitate a fuller and more complete understanding of the process of this invention and the presently preferred method of practicing same, a description of a specific embodiment thereof follows:

Example

A batch of suitable fish and animal carcasses is placed in a suitable reaction vessel and steam under pressure is passed directly into the mass until the temperature of the mass is about 119° C. Liquid perchloroethylene then is added to the heated mass and heating is continued whereby the perchloroethylene-water azeotrope distills from the mass, thereby effecting dehydration of the same, and fatty materials present in the mass are dissolved in the organic solvent. The liquid organic solvent extract is removed from residual solid material, then this residual extracted solid material is infused with vapors of perchloroethylene until the effluent vapors have a temperature of about 119° C. The infused material then is treated directly with steam under pressure at a temperature of about 115° C. to effect removal of perchloroethylene, and the desired product then is obtained in dry, odorless, substantially fat-free, powdery or pulverulent state.

I claim:

Process for making a dry, pulverulent, essentially odorless, substantially fat-free product, suitable for use as an animal feed, from a fat-containing substance of animal origin, that comprises heating and treating said substance with directly applied steam under pressure, whereby it is heated to a temperature of about 119° C.; adding liquid perchloroethylene to this heated substance and heating to cause distillation of perchloroethylene, whereby the substance is subjected simultaneously to dehydration and fat-extraction; removing the liquid extract from the residual extracted solid material; infusing perchloroethylene vapors into the residual extracted solid material until the effluent vapors have a temperature of about 119° C.; removing the perchloroethylene from the infused material by direct treatment with steam under pressure at a temperature of about 115° C.; and then recovering the desired product as a dry, essentially odorless, substantially fat-free, pulverulent substance.

References Cited in the file of this patent

UNITED STATES PATENTS

| | | |
|---|---|---|
| 573,714 | Simonin | Dec. 22, 1896 |
| 915,169 | Frank | Mar. 16, 1909 |
| 1,267,611 | Wells | May 28, 1918 |
| 1,934,677 | Ash | Nov. 14, 1933 |
| 2,567,179 | Bonotto | Sept. 11, 1951 |
| 2,585,793 | Kruse | Feb. 12, 1952 |
| 2,607,687 | Rice | Aug. 19, 1952 |
| 2,619,425 | Levin | Nov. 25, 1952 |

FOREIGN PATENTS

| | | |
|---|---|---|
| 9,018 | Great Britain | June 2, 1904 |